United States Patent

Brossard

[11] Patent Number: 5,169,176
[45] Date of Patent: Dec. 8, 1992

[54] HEAT SHRINKABLE CLAMPING, CONNECTING, REPAIR, AND REINFORCING SLEEVE AND METHOD OF USE

[76] Inventor: Robert L. Brossard, 470 6th Ave., Salt Lake City, Utah 84103

[21] Appl. No.: 575,168

[22] Filed: Aug. 30, 1990

Related U.S. Application Data

[63] Continuation of Ser. No. 308,445, Feb. 10, 1989, abandoned.

[51] Int. Cl.$^5$ .............................................. F16L 35/00
[52] U.S. Cl. ......................................... 285/21; 285/381; 285/423; 285/242; 174/DIG. 8; 156/84; 156/86; 219/535
[58] Field of Search ................ 285/381, 21, 242, 423, 285/239, 240; 174/DIG. 8; 156/84, 85, 86, 158, 304.2; 219/535, 544

[56] References Cited

U.S. PATENT DOCUMENTS

| | | |
|---|---|---|
| 3,315,986 | 4/1967 | Quick . |
| 3,565,116 | 2/1971 | Gabin . |
| 3,828,119 | 8/1974 | Warburton et al. ..... 174/DIG. 8 X |
| 4,092,193 | 5/1978 | Brooks ............................ 285/381 X |
| 4,151,364 | 4/1979 | Ellis ............................ 174/DIG. 8 X |
| 4,271,329 | 6/1981 | Perelmuter .................... 285/381 X |
| 4,465,309 | 8/1984 | Nimke et al. .................. 285/381 X |
| 4,631,098 | 12/1986 | Pithouse et al. .......... 174/DIG. 8 X |
| 4,777,859 | 10/1988 | Plummer, Jr. ............. 174/DIG. 8 X |
| 4,790,569 | 12/1988 | Chaffee ....................... 285/242 X |
| 4,803,103 | 2/1989 | Pithouse et al. .......... 174/DIG. 8 X |
| 4,816,309 | 3/1989 | Hutt et al. ................ 174/DIG. 8 X |
| 4,923,226 | 5/1990 | Bartholomew .................... 285/242 |
| 4,991,876 | 2/1991 | Mulvey ............................ 285/21 |

FOREIGN PATENT DOCUMENTS

| | | | |
|---|---|---|---|
| 22737 | 8/1921 | France ............................ 285/239 |
| 727061 | 6/1932 | France ............................ 285/240 |
| 13805 | 5/1978 | Japan .............................. 285/381 |
| 585367 | 2/1977 | Switzerland ................... 285/381 |
| 2076489 | 12/1981 | United Kingdom ............ 285/381 |

OTHER PUBLICATIONS

Brookstone "Hard-To-Find Tools" Brochure, Fall 1987, Heat Shrinkable Adhesive Tape, p. 21.

Primary Examiner—Randolph A. Reese
Assistant Examiner—Heather Chun
Attorney, Agent, or Firm—Mallinckrodt & Mallinckrodt

[57] ABSTRACT

A sleeve for clamping and connecting items to be clamped or connected includes a plurality of windings of heat shrinkable material bound into a sleeve which is placed over the item to be clamped or items to be connected. The heat shrinkable material in the sleeve is secured in such a way that upon application of heat to the sleeve, the heat shrinkable windings will shrink and exert inward compressive pressure about the inner surface of the sleeve and thereby about the item to be clamped or the items to be connected. When desired for clamping a tubular item, the clamp can be incorporated as part of the tubualr item by incorporating the windings of heat shrinkable material into the end of the tubular item. The method of clamping of the invention includes the steps of positioning a tubular item over the item to which it is to be clamped and then placing a pluraltiy of windings of a heat shrinkable material about the tubular item where it surrounds the item to which it is to be clamped. Heat is then appllied to the windings to cause them to shrink and put clamping pressure about the tubular item.

22 Claims, 3 Drawing Sheets

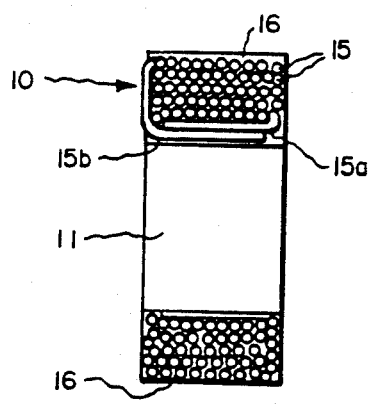
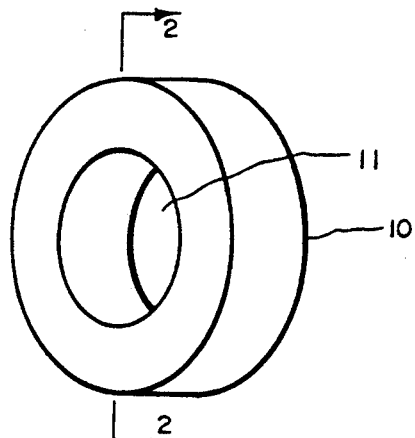
FIG. 2   FIG. 1
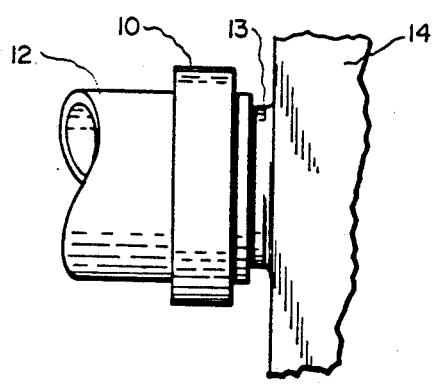
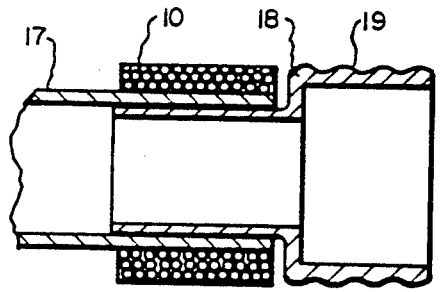
FIG. 3   FIG. 4
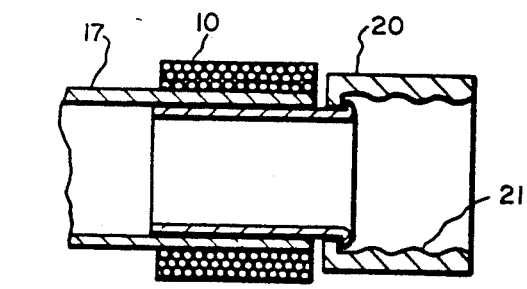
FIG. 5
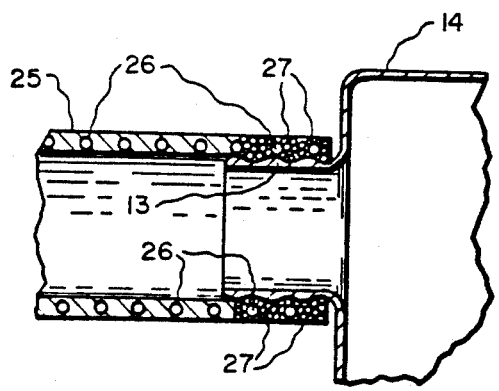
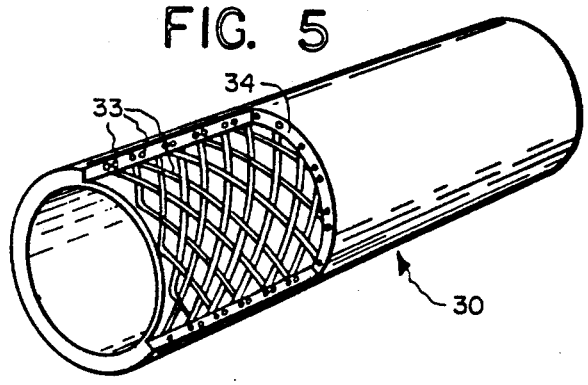
FIG. 6   FIG. 7

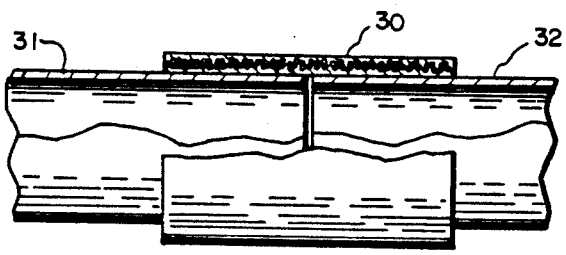
FIG. 8
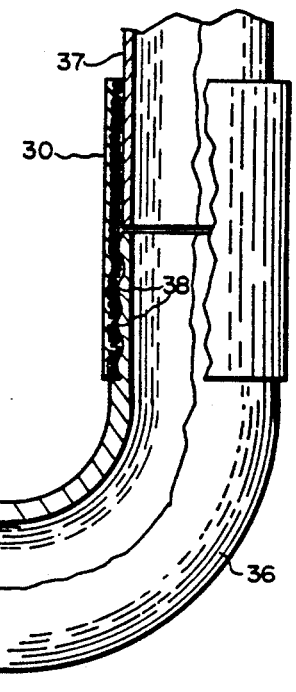
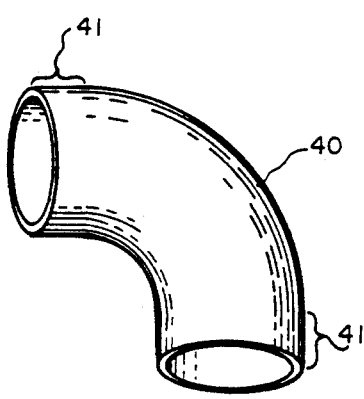
FIG. 9
FIG. 10
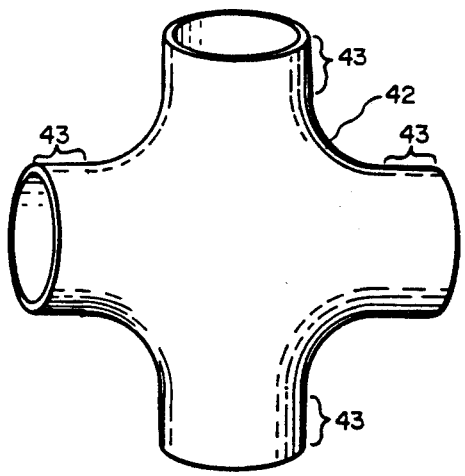
FIG. 11
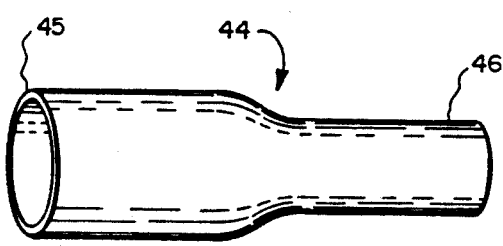
FIG. 12

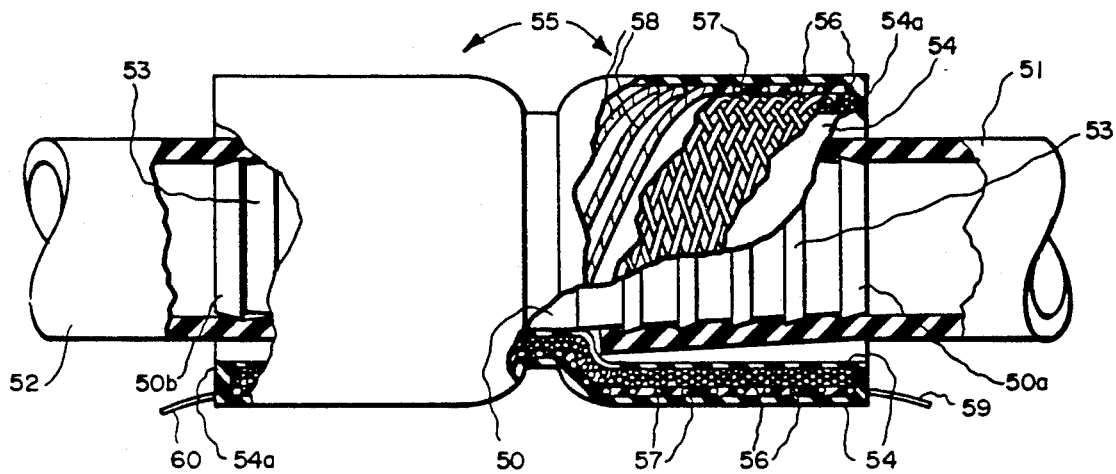
FIG. 13
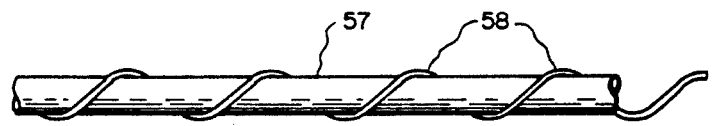
FIG. 14
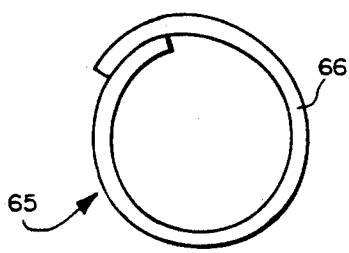
FIG. 15
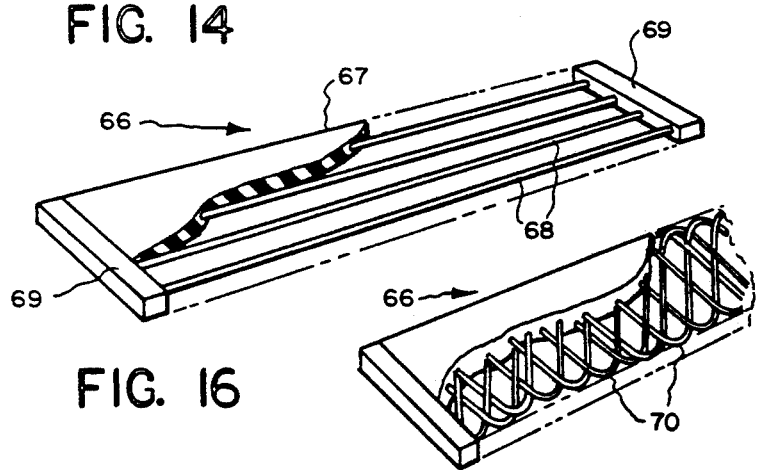
FIG. 16
FIG. 17
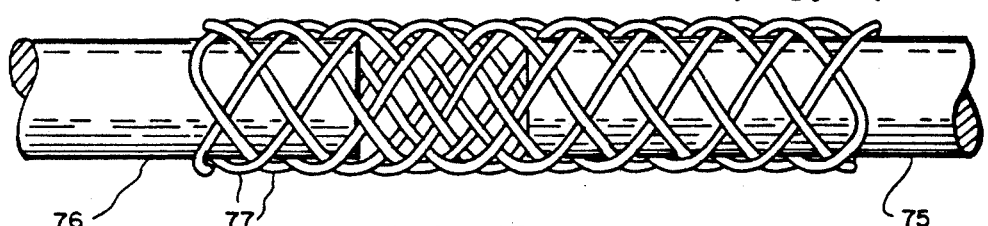
FIG. 18

HEAT SHRINKABLE CLAMPING, CONNECTING, REPAIR, AND REINFORCING SLEEVE AND METHOD OF USE

This is a continuation of application Ser. No. 07/308,445, filed Feb. 10, 1989 now abandoned.

BACKGROUND OF THE INVENTION

1. Field

The invention is in the field of clamps for connecting flexible hoses to hose fittings and in the field of couplings for connecting items together.

2. State of the Art

There are various clamps currently available for clamping the ends of flexible hoses to hose fittings, such as clamping the ends of automobile radiator hoses to the receiving collar for such hoses attached to the radiator. Most clamps include a metal band which fits about the outside of the hose and has some type of screw mechanism for tightening the clamp about the hose to thereby tighten the hose about the receiving collar. This secures the hose in place and prevent leaks. Some clamps are merely made of a spring metal and have a normal diameter small than the hose to be clamped. A special tool is used to force the clamp to a larger diameter to slip over the hose and when in position, the clamp is released and the clamp tightens about the hose.

In joining items together such as shafts or pipes, sleeves are sometimes used to surround the end of each item and hold the items in position relative to one another. With shafts, a resilient sleeve is sometimes used with the respective shaft ends to be joined forced into the sleeve thereby stretching it to a degree whereby the ends of the shafts are held tightly by the sleeve. With items such as pipe, sleeves are placed over the ends of adjacent lengths of pipe either by means of mating threads in the pipes and sleeve or by means of glue on the ends of the pipes and the interior of the sleeve.

Heat shrinkable material is currently used for covering electrical connections and generally takes the form of a homogenous sleeve of such material which is slipped over a wire before the connection is made. After the connection is made, the sleeve is slid over the connection and then heated so that the sleeve shrinks to tightly cover the connection. While such material works well to cover and seal such a connection, the compressive strength of the heat shinkable sleeve is usually small. Heat shrinkable tape, which is also commercially available, has the same problem of compressive strength. Neither the commercially available heat shrinkable sleeves nor the heat shrinkable tape is suitable for compressing tubing to secure it to tubing fittings or, generally, to secure various items together. U.S. Pat. No. 3,315,986 discloses the use of a homogeneous heat shrinkable sleeve as a clamp for flexible hose or pipes and U.S. Pat. No. 3,565,116 shows a homogeneous sleeve of heat shrinkable material used as a cover and reinforcement for a hose connector. While there are some materials which in the form of a homogenous sleeve can exert high compressive forces upon being subjected to heat and shrinking, such materials are expensive, have a small percentage of shrinkability, and have to be heated to undesireably high temperatures of up to about 500° F. or more for shrinking to occur. The use of homogeneous sleeves of heat shrinkable material for clamping and connecting purposes has not been widespread.

It would be desirable to be able to get high compressive forces using relatively low cost materials which shrink at relatively low temperatures.

SUMMARY OF THE INVENTION

According to the invention, a clamping or connecting sleeve includes a plurality of strands of heat shrinkable material bound together into a sleeve with the heat shrinkable strands secured so that upon shrinking of the strands, the strands will exert compressive force toward the inner surfaces of the sleeve and about an item to be clamped or connected inside the sleeve. It has been found that by making the sleeve with a plurality of heat shrinkable strands therein rather than a homogeneous heat shrinkable material, the compressive force exerted by the sleeve is much greater than with a sleeve of homogeneous material. While a sleeve of most homogeneous heat shrinkable material cannot exert enough pressure on the end of a hose, for example, to take the place of the usual hose clamps, a sleeve made of a plurality of heat shrinkable strands can exert enough compressive pressure to securely hold a hose and seal it against leaks. With a plurality of windings of a single continuous strand of heat shrinkable material, or of several separate strands secured together, the force exerted by the material upon shrinking is multiplied and is proportional to the number of windings present in the sleeve. Further, by weaving the strands into a cross weave pattern, not only is the compressive strength of the sleeve increased because of the multiple windings, but the lateral strength of the sleeve is increased greatly with an overall increase in the holding strength of a joint made with such sleeve.

The invention includes the method of clamping a flexible tubular item about some other item such as a receiving collar or nipple and includes the steps of providing the tubular item and placing it over the item to which it is to be clamped. A plurality of windings of a heat shrinkable material are placed about the tubular item where it surrounds the item to which it is to be clamped and heat is then applied to the heat shrinkable material to thereby clamp the tubular item to the item to which it is to be clamped.

THE DRAWINGS

In the accompanying drawings which illustrate embodiments showing the best mode presently contemplated for carrying out the invention:

FIG. 1, is a perspective view of a clamp of the invention;

FIG. 2, a vertical section taken on the line 2—2 of FIG. 1;

FIG. 3, a fragmentary top plan view of an automobile radiator with radiator hose secured thereto with the clamp of FIG. 1;

FIG. 4, a fragmentary vertical section through a connection of a flexible garden hose to a male hose connector using a clamp of the invention;

FIG. 5, a fragmentary vertical section through a connection of a flexible garden hose to a female hose connector using a clamp of the invention;

FIG. 6, a vertical section through a radiator hose and receiving sleeve showing a clamp of the invention built into the hose;

FIG. 7, a perspective view of a sleeve for joining items made according to the invention, a portion of the sleeve being broken away to show the interior construction;

FIG. 8, a fragmentary vertical section through the ends of two abutted pipes joined by a sleeve of the invention;

FIG. 9, a fragmentary vertical section through an elbow connecting two pipes by means of sleeves of the invention;

FIG. 10, a perspective view of an elbow of the invention;

FIG. 11, a perspective view of cross connectors of the invention;

FIG. 12, a perspective view of an adapter of the invention to connect pipes of different diameter;

FIG. 13, a vertical section of a self contained hose repair clamp of the invention;

FIG. 14, an enlarged, fragmentary side elevation of a component of the hose clamp of FIG. 13, showing the configuration of the heating element;

FIG. 15, an end elevation of an additional embodiment of a clamp or connector of the invention;

FIG. 16, a perspective view of an example of the flexible material used to form the clamp of FIG. 15 showing the material in flat condition with a portion of the material broken away to show the internal structure;

FIG. 17, a fragmentary view of another example of the flexible material used to form the clamp of FIG. 15 showing the material in flat condition with a portion of the material broken away to show the internal structure; and FIG. 18, a side elevation of a further embodiment of the invention used for connecting items together.

DETAILED DESCRIPTION OF THE ILLUSTRATED EMBODIMENTS

FIGS. 1–3 show the invention in its simpliest form as a heat shrinkable clamp to replace standard metal hose clamps. As shown in FIG. 1, the clamp takes the form of a ring or sleeve 10 with opening 11 large enough to be slipped over a hose such as an automobile radiator hose 12, FIG. 3. After placing the ring 10 over the hose in similar manner as a normal hose clamp, the hose is pushed onto the radiator hose receiving collar 13 on radiator 14. The ring 10 is then heated by any suitable means such as a heat gun or, if the temperature required to shrink the material is less than the boiling temperature of water, by running the engine which will cause the ring to heat. In any case, upon being heated to the temperature to cause the ring to shrink, the ring shrinks around the hose and clamps the hose securely to the receiving collar.

Ring 10 is made up of a plurality of windings of a heat shrinkable strand 15, FIG. 2. The windings are preferably made with a single continuous length of heat shrinkable strand or of strands joined together end to end to form a continuous length. It is also preferred that the two ends of the continuous length be secured together so that an endless length of heat shrinkable strand is formed. This insures that shrinking of the strand will cause it to create inward pressure on the opening 11 of the ring and cause the opening to become smaller in diameter. Securing the ends of the strand together is not necessary if the windings are formed so as to substantially secure the ends of the strand upon shrinking to keep the strand from merely unwinding as it shrinks. For example, if end 15a extends across under windings 15 and end 15b also extends across under windings 15 as shown in FIG. 2, as the windings 15 shrink they secure ends 15a and 15b against the hose passing through opening 11 in the ring against which windings 15 are exerting compressive pressure. Thus, while ends 15a and 15b could be glued or otherwise secured together, they need not be because they will be held securely by the compressive force of shrinking windings 15 against the items to be clamped.

The plurality of windings are bound into the sleeve or ring by a binding material 16 which surrounds the windings and fills any voids between the windings and binds them into the ring. The binding material may be any type of resilient material such as a plastic or rubber that does not affect the heat shrinkable strands and which will allow the inside diameter of the ring to be reduced upon shrinking of the strands, and, if desired, may itself be a heat shrinkable material.

Ring 10 could be used in various clamping situations such as clamping a garden hose or other plastic tubing or pipe 17 to a threaded male hose fitting 18 with threads 19, FIG. 4, or to a threaded female hose fitting 20, FIG. 5, with threads 21. Rather than a separate ring as shown in FIGS. 1–5 which fits over a hose to be clamped, the heat shrinkable strands may be provided as part of the end section of a hose itself so that a separate clamp is not be necessary. Thus, as shown in FIG. 6, a radiator hose 25 is constructed in normal manner with the usual reinforcing fibers 26 embedded therein along the entire length of hose. These reinforcing fibers are substantially non-heat shrinkable. The end portion of the hose which is adapted to fit over the receiving sleeve 13 of radiator 14 has a plurality of windings of heat shrinkable material 27 embedded therein in addition to the reinforcing material 26. A radiator hose of this type merely needs to be slipped onto the receiving sleeve 13 of radiator 14 and heated in any suitable manner to cause the heat shrinkable strands 27 to shrink to form a fluid tight pressure seal without an additional clamp. Since most radiator hoses will form a tight fit about sleeve 13 without clamping and such fit will be sufficient to prevent substantial leakage without pressure in the cooling system, if the heat shrinkable strands are chosen to shrink at a temperature below that reached in the cooling system, the hose may be slipped over sleeve 13, the cooling system filled with coolant, and the engine started to warm up the cooling system. As the system warms up, but before pressure builds up in the system, the heat shrinkable strands would shrink to form a fluid tight pressure seal. Since the heat shrinkable strands are embedded in the hose itself which is against the sleeve, good heat transfer from the coolant through the sleeve and hose is obtained to cause shrinking of the strands prior to any substantial pressure build up in the cooling system and any substantial leakage of coolant.

While FIGS. 2, 4, 5, and 6 show representations of the heat shrinkable strands and show several layers of strand windings, it should be realized that for purposes of illustration, the size of the strands in relation to the clamp has been exagerated and the size of the strands will not generally be as large as represented. In addition, the number of layers of windings has been reduced in the illustrations over those which would be generally used in such a clamp, the actual number of layers of windings generally being greater than the number shown. The actual number of windings and the size of the strands will depend upon the particular application for the clamp. A clamp used to secure rubber tubing to a brass coupling worked well with about 150 windings over a length of about three-quarters inch. The windings were of a 840 denier-T-717 Industrial nylon continuous filament yarn sold by E. I. Du Pont de Nemours & Company which exhibits a 9.3% shrinkage at the temperature of boiling water. Shrinking of the strand was accomplished by immersing the connections in boiling water of about 180° F. Two of these connections were made and tested in a hot water pressure line with the hot water at about 130° F. and at a pressure of 125 PSI with one of the connections held in a boiling water bath at about 180° F. and the other connection held in the air. No leakage was observed from either connection over a test period of one and one half hours.

FIG. 7 shows a sleeve of the invention particularly adapted to joining objects together such as pipes or shafts. The sleeve 30, FIG. 8, is slipped over the ends of the objects to be joined, for example adjacent pieces of pipe 31 and 32, and the sleeve is then heated to cause it to shrink and securely hold the pieces together. It also seals the joint where the pipes come together to prevent leaks between pipes even with the fluid in the pipe under substantial pressure.

As illustrated, the heat shrinkable strands 33, FIG. 7, are woven into a sleeve with the strands wound at an angle or bias to both the longitudinal axis of the sleeve and the perpendicular axis of the sleeve. In addition, as in the clamp of FIGS. 1-3, several layers of windings are provided. The angle of the windings in the sleeve may vary to a large extent. It is presently believed that an angle of between about ten to twenty degrees to the perpendicular will provide the maximum strength to the sleeve and will provide an effect similar to the old Chinese finger traps which tend to tighten about the joined members if the members tend to pull apart, although angles up to about forty-five degrees may be desireable for certain uses. An angle of about fifteen degrees is believed to be optimum for the finger trap effect and is equal to the angle used in well known Kellums cable anchors or Ellis post clamps. To some degree the angle used will depend upon the length of the sleeve with generally lesser angles used in shorter sleeves so that a strand will make at least a complete revolution about the sleeve in the length of the sleeve.

As with the clamp of FIGS. 1-3, a matrix material 34 surrounds the strands and binds them into the sleeve.

While FIG. 7 shows the sleeve 30 made as an individual sleeve with the individual woven strands shown as continuous lengths changing directions at the edge of the weave; the sleeve could be cut to length from a longer or continuous sleeve which might be more economical to manufacture. In such instance the ends of the strands at the ends of the cut sleeves would be secured together in any suitable manner such as by bonding them together with an adhesive applied about the ends of the sleeves or by bonding them together by fusing them such as by heat fusing the ends of the strands together. This may be accomplished by cutting the tube into sleeves of desired length with a hot knife or by otherwise applying heat to the ends of the cut sleeves. When applying heat to the ends of the sleeves in any manner, it is necessary to take steps to insure that shrinking of the strands during such heating does not take place.

FIG. 9 shows sleeves of the invention used to connect a pipe 35 in abutting relationship to the end of an elbow 36, and to a second pipe 37 abutting the other end of elbow 36. The ends of elbow 36 are of an outside diameter about equal to the outside diameter of pipes 35 and 37 and are provided with ridges 38 to help ensure that the sleeves cannot be easily pulled therefrom. The ridges 38 are not generally necessary as the sleeves of the inventions will normally hold a smooth surface such as shown for pipes 35 and 37. However, it may be desirable to use a longer sleeve when ridges are not present to provide more surface area between the pipe and sleeve to insure a strong connection. The sleeve connecting elbow 36 with pipe 37 is identical to the sleeve of FIGS. 7 and 8 and is similarly labeled with reference number 30, while the sleeve 39 connecting elbow 36 with pipe 35 is similar to sleeve 30 but has more windings about the center portion of the sleeve than about the outer portions to give increased strength about the center portion of the sleeve which is the portion of the sleeve surrounding the joint.

FIG. 10 shows an elbow 40 of the invention which is built of a fiber reinforced resilient material similar to the radiator hose 25 of FIG. 6 with a plurality of heat shrinkable strand windings embedded about the end portions 41 of the elbow so that the ends of the elbow may be slipped over the ends of pipes to be connected and then heated to tightly clamp the pipes. FIG. 11 shows a fiber reinforced cross "T" with heat shrinkable strands embedded about the outlet portions 43 adapted to fit over the ends of pipes to be joined and FIG. 12 shows a pipe size reducing connector 44 having a larger diameter end 45 adapted to fit over a larger diameter pipe and a smaller diameter end 46 adapted to fit over a smaller diameter pipe to join the two. Again, a plurality of windings of heat shrinkable strands are embedded in the ends of the connector to tightly clamp about the ends of the pipe inserted thereinto upon heating of the adapter 44.

FIG. 13 shows a coupling of the invention specifically designed for repairing hoses, such as home garden hoses, although it can be used with various types of other hoses or flexible pipe. The coupling has an inside double tapered nipple 50 about which the ends of the hose pieces to be joined are placed. Thus, the end of one hose piece 51 will be slid over one end 50a of nipple 50 and the end 52 of the other piece to be joined is slid over end 50b of the nipple. The tapered configuration of the nipple is preferred to ease the sliding of the nipple into the ends of the hose pieces. The nipple may have ridges 53 thereabout to help hold the hoses in place over the nipple.

A layer of resilient matrix material 54 forms a sleeve 55 which extends from securement to the center portion of nipple 50 toward the ends of the nipple 50 and, in initial, unshrunken condition, will fit over hose ends 51 and 52 as shown. Several layers of windings of heat shrinkable strands 56 are embedded in the sleeve as shown. While only two layers are shown for ease of illustration, normally more layers would be provided, the number of layers of windings being sufficient to provide the desired compressive force about hose ends 51 and 52 when the strands are heated and shrinking occurs. These strands may be wound substantially transversely about the sleeve as in the ring of FIG. 2, or preferably, as illustrated, are woven in cross weave manner to provide increased strength to the sleeve and provide the "finger trap" action as discussed for the sleeve of FIG. 7. Depending upon the form of winding, if the strands have their ends cut and loose at the ends of the sleeve, the ends of the strands should be bonded together by a bonding material 54a at the ends of the sleeve.

An additional layer of heat shrinkable strand 57 having an electrical resistance heating filament 58 wrapped about it along its length, see FIG. 14, is wound over heat shrinkable strands 56. Generally, a single layer of the strand 57 will be sufficient. Opposite ends of the electrical resistance heating filaments are connected to contacts 59 and 60, respectively. The matrix material 54 which forms the inner surface of sleeve 55 also fills in about the strands and forms an outer surface for sleeve 55.

To secure sleeve 55 to the central portion of nipple 50, the central portion only of the sleeve may be heated to cause it to shrink about nipple 50 and securely hold it in place while the ends of the sleeve extending from the center portion of the nipple outwardly over its ends remain in unshrunken condition.

To use the coupling shown in FIG. 13, hose ends 51 and 52 are slid over nipple 50 and a source of electricity is connected to terminals 59 and 60. This causes electrical current to flow through electrical resistance heating filaments 58 causing them to heat. The heat, in turn, causes the heat shrinkable strands 56 and 57 to shrink to exert compressive force about hose ends 51 and 52 to thereby secure or clamp them to nipple 50.

A hose coupling similar to that shown in FIG. 13, may be made without the heating elements therein so that when in place between the lengths of hose to be joined, the user would merely heat the coupling as he would the clamps or sleeves previously described. This heating could be by use of a heat gun or torch, or, when the heat shrinkable strands shrink at or below the temperature of boiling water, by merely pouring boiling water over the sleeve to cause the shrinking.

FIG. 15 shows a further embodiment of a clamp similar to that shown in FIGS. 1 and 2, but rather than formed with a continuous winding of a heat shrinkable strand, the ring 65 is formed of a strip 66, FIG. 16, of matrix material 67 having a plurality of layers of a plurality of heat shrinkable strands 68 therein secured such as by gluing or heat fusion at the ends of the strip as at 69. Only a single layer of widely spaced strands are shown in FIG. 16 for ease of illustration, but normally several layers of closely spaced strands would be used. The ends of the strip are then secured together in any suitable manner, such as by overlapping and gluing or stitching or by use of a suitable connector such as a metal connector crimped to the respective ends of the strip, to form a sleeve such as shown in FIG. 15. FIG. 17 shows an alternate construction of strip 66 wherein heat shrinkable strands 70 are woven rather than being parallel. The embodiments of FIGS. 15, 16, and 17 are useful where wide connectors for large diameter pipes are needed such as connectors for culverts, sewer pipes, etc. The thickness of the strip as shown in FIGS. 15, 16, and 17 is exagerated. In practice, the strip would be proportionally thinner so that when overlapped as shown in FIG. 15, would, upon shrinking, substantially tightly surround the item about which it is placed, even at the overlapping end. If a better seal is required, the ends of the strip could be joined without the overlap.

Where it is merely desired to secure items together and a sealing of the joint between them is not necessary, such as securing ends 75 and 76 of ropes or cables, an open weave of heat shrinkable material 77 such as shown in FIG. 18, without the matrix material thereabout, may be used. In such embodiments the weave of the heat shrinkable material itself serves to hold it together in the form of a sleeve. This construction is similar to a Kellums rope securement, but, upon shrinking, securely binds the rope or cable ends together and tension on the rope ends is not necessary to keep the sleeve tight about the ends. Tension on the ends merely increases the holding strength of the sleeve. While the weave of heat shrinkable material 77 is shown as very open for ease of illustration, the weave could be as close as desired. Further, depending upon the heat shrinkable material used, the sleeve may be of a stiff, form retaining sleeve shape into which the ends of the items to be joined may be easily placed, or may be of a softer construction requiring that the sleeve be pulled over the ends of the items to be joined.

In each of the embodiments shown, the strands of heat shrinkable material may be in the form of a single filament or fiber or may be made up of a plurality of filaments or fibers. In addition, various materials may be used for the strands and the temperature at which the strands shrink may vary greatly. It is preferred particularly for consumer applications such as garden hose repairs and for automative cooling system applications that the shrinking temperature of the strands be less than the normal boiling temperature of water so that special equipment such as heat guns or torches are not necessary to activate the sleeves. With a shrinking temperature less than the boiling temperature of water, a user merely needs to boil some water and pour it over the sleeve to be shrunk. Further, with automobile cooling system applications, if the shrinking temperature of the strands is less than the normal operating temperature of the cooling system, the mere operation of the automobile ensures shrinking of the strands and tightening of the clamp. Also, while various embodiments have been shown with various weaves of heat shrinkable material, a wide variety of weaves and angles of weaves may be used.

While a nylon filament has been described in an example, various types of heat shrinkable material could be used for the strands. An important feature of the invention is that the sleeves or clamps have a plurality of windings of heat shrinkable strands rather than being of homogeneous construction. A plurality of strands provide greater pressure during shrinking than does a homogeneous mass of the same material. Thus, sleeves of the invention may be made of a plurality of strands of low cost heat shrinkable material with low shrinking temperatures which could not be used satisfactorily in homogeneous sleeve form.

Various methods of applying heat to the heat shrinkable windings may be used, such as a heat gun, torch, or boiling water, as mentioned, or a heat source could be built in to generate heat in various ways, such as with the use of electrical resistance heating elements as mentioned, or by various other means, such as by providing chemicals which are mixed to generate heat. Thus, chemicals could be included in separate, breakable packages in the sleeve so that when the sleeve is in position for heat to be applied, the sleeve is manipulated to break the packages or otherwise mix the chemicals so that the chemicals react and produce the necessary heating to shink the windings.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A clamping, connecting, repair, and reinforcing sleeve for connecting elongate items to be connected, comprising at least one length of heat shrinkable material wound as a single, continuous, and unbroken length into a plurality of overlapping layers of windings of heat shrinkable material, said at least one length of heat shrinkable material having end portions; means binding the layers of windings of heat shrinkable material into a sleeve; and means securing the end portions of the at least one length of heat shrinkable material whereby the material upon shrinking will exert inward compressive pressure about the inner surface of the sleeve, wherein the at least one length of heat shrinkable material is in the form of a strand.

2. A sleeve according to claim 1, wherein the strand has ends and the means securing the end portions of the at least one length of heat shrinkable material secures the ends of the strand together.

3. A sleeve according to claim 2, wherein the ends of the strand are secured together by bonding them together.

4. A sleeve according to claim 1, wherein the strand has end portions, wherein the strand is wound so that the ends of the strand extend between at least some of the plurality of overlapping layers and the items to be connected, and wherein the means securing the end portions of the at least one length of heat shrinkable material secures the end portions of the strand by friction of overlying windings on the end portions of the strand.

5. A sleeve according to claim 1, wherein the sleeve has a length and the windings of heat shrinkable material extend substantially perpendicularly to the length of the sleeve.

6. A sleeve according to claim 1, wherein the sleeve has a length and the windings of heat shrinkable material extend at angles to the length of the sleeve.

7. A sleeve according to claim 6, wherein the windings are woven.

8. A sleeve according to claim 6, wherein the windings of heat shrinkable material extend at angles of between 10° and 20° to the perpendicular to the length of the sleeve.

9. A sleeve according to claim 1, wherein the at least one length of heat shrinkable material includes a plurality of lengths of heat shrinkable material, each length being wound as a single, continuous, and unbroken length into a plurality of overlapping layers of windings of heat shrinkable material.

10. A sleeve according to claim 9, wherein the plurality of lengths of heat shrinkable material are woven together.

11. A sleeve according to claim 1, wherein the means binding the windings into a sleeve is a matrix material surrounding the windings.

12. A sleeve according to claim 1, wherein the windings are woven and wherein the means binding the windings into a sleeve is the weaving of the windings.

13. A sleeve according to claim 12, wherein the windings are sufficiently stiff so that when woven into a sleeve the sleeve retains its shape.

14. A sleeve according to claim 1, wherein there are additionally included heating means within the sleeve to cause heating of the sleeve when desired to cause shrinking of the heat shrinkable material.

15. A sleeve according to claim 1, wherein at least a first item of the items to be joined is tubular and is adapted to receive the other of the items within an end of the first item and wherein the sleeve is included as an integral part of the end of the first item.

16. A one piece connecting and repair device for connecting lengths of hose, comprising a nipple having a central portion and opposite end portions extending outwardly from the central portion and over which the ends of the lengths of hose to be connected are placed; a sleeve having a central portion secured to the central portion of the nipple and end portions extending outwardly therefrom surrounding but spaced radially from the opposite end portions of the nipple so that the ends of the lengths of hose to be connected, when placed over the nipple, are between the nipple and the sleeve; at least one length of heat shrinkable material wound continuously into a plurality of overlapping layers of windings of heat shrinkable material embedded in at least each of the portions of the sleeve surrounding the opposite end portions of the nipple, said at least one length of heat shrinkable material having end portions; and means securing the end portions of the heat shrinkable material in the sleeve whereby the material, upon shrinking will contract about the ends of the lengths of hose to be connected and exert compressive pressure about the inner surface of the sleeve and about the respective ends of the hoses placed over the nipple so as to secure said ends of the hoses to the nipple.

17. A connecting and repair device according to claim 16, wherein there is additionally included a heating element embedded in the sleeve operable when desired to produce heat to cause the heat shrinkable material to shrink.

18. A connecting and repair device according to claim 17, wherein the heating element is at least one length of electrical resistance wire spirally wrapped around the at least one length of heat shrinkable material over at least a portion of its length so as not to interfere with shrinking of the at least one length of heat shrinkable material during heating.

19. A connecting and repair device according to claim 17, wherein each of the portions of the sleeve surrounding the opposite end portions of the nipple include an inner plurality of overlapping layers of windings of heat shrinkable material and an outer layer of heat shrinkable material surrounding the inner layers and in heat transmitting communication therewith, and wherein the heating element is at least one length of electrical resistance wire spirally wrapped around the heat shrinkable material forming the outer layer of heat shrinkable material.

20. A connecting and repair device according to claim 16, wherein the opposite ends of the nipple taper to a smaller diameter as they extend outwardly from the central portion.

21. A clamping, connecting, repair, and reinforcing sleeve for connecting elongate items to be connected, comprising a single length of heat shrinkable material wound continuously into a plurality of overlapping layers or windings or heat shrinkable material, said length of heat shrinkable material having end portions; means binding the layers of windings of heat shrinkable material into a sleeve; and means securing the end portions of the length of heat shrinkable material whereby the material upon shrinking will exert inward compressive pressure about the inner surface of the sleeve, wherein the at least one length of heat shrinkable material is in the form of a strand.

22. A sleeve according to claim 21, wherein at least a first item of the items to be joined is tubular and is adapted to receive the other of the items within an end of the first item, and wherein the sleeve is included as an integral part of the end of the first item.

* * * * *